United States Patent
Frankhauser et al.

(10) Patent No.: US 9,495,216 B2
(45) Date of Patent: Nov. 15, 2016

(54) OPTIMIZATION OF JOB SCHEDULING IN A COMPUTING ENVIRONMENT

(71) Applicant: International Business Machines Corporation, Armonk, NY (US)

(72) Inventors: Michael Frankhauser, DN Karkur (IL); Benjamin Halberstadt, Jerusalem (IL); Roger K. Hecker, Efrat (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 14/294,277

(22) Filed: Jun. 3, 2014

(65) Prior Publication Data
US 2015/0112921 A1 Apr. 23, 2015

Related U.S. Application Data

(63) Continuation of application No. 14/061,017, filed on Oct. 23, 2013.

(51) Int. Cl.
*G06F 17/30* (2006.01)
*G06F 9/50* (2006.01)
*G06F 9/48* (2006.01)
*G06Q 10/06* (2012.01)

(52) U.S. Cl.
CPC ........... *G06F 9/5027* (2013.01); *G06F 9/4843* (2013.01); *G06Q 10/0631* (2013.01)

(58) Field of Classification Search
CPC ............... Y10S 707/99932; Y10S 707/99933; G06F 17/30386; G06F 17/30389
See application file for complete search history.

(56) References Cited

U.S. PATENT DOCUMENTS

| | | | | |
|---|---|---|---|---|
| 2005/0289137 | A1* | 12/2005 | Wu | G06F 17/24 |
| 2009/0254393 | A1* | 10/2009 | Lollichon | G06Q 30/04 |
| | | | | 705/34 |
| 2012/0226684 | A1* | 9/2012 | Holt | G06Q 50/18 |
| | | | | 707/726 |
| 2015/0112945 | A1* | 4/2015 | Frankhauser | G06F 9/4843 |
| | | | | 707/654 |

OTHER PUBLICATIONS

List of IBM Patents of Patent Applications Treated as Related—Date Filed: Oct. 23, 2013; 1 page.

* cited by examiner

*Primary Examiner* — Cheryl Lewis
(74) *Attorney, Agent, or Firm* — Cantor Colburn LLP

(57) ABSTRACT

Optimizing job scheduling in a data processing system includes determining a time factor associated with a report, determining one or more jobs that contribute to the report, and narrowing execution frequency of the one or more jobs based on the time factor of the report. The time factor provides information about timing details for data included in the report. The jobs are executed in a computing environment according to a time schedule.

15 Claims, 4 Drawing Sheets

OPTIMIZATION OF JOB SCHEDULING IN A COMPUTING ENVIRONMENT

CROSS-REFERENCE TO RELATED APPLICATION

This application is a continuation of U.S. patent application Ser. No. 14/061,017, filed Oct. 23, 2013, the content of which is incorporated by reference herein in its entirety

BACKGROUND

The present disclosure relates generally to optimizing job schedules in a computing environment and, more particularly, to scheduling the execution of computational jobs based on the time dimension of reports dependent on such jobs.

Many large enterprises utilize a data warehouse to store consolidated business data to facilitate enterprise reporting, analysis and decision making processes. A data warehouse provides a sanitized repository of current and historical details for analytics, data mining, strategic planning, and reporting. Data generated by an enterprise's internal operations may be stored in the data warehouse and thereafter moved to domain-specific data marts to help generate analytical business intelligence (BI) reports. The BI reports may provide information about important trends, risk exposure, liabilities and assets, for example.

The flow and transformation of information from the operational systems to the BI reports via data warehouses and data marts can be very complicated. The data will need to flow through data warehouses, staging databases, extract, transform, and load (ETL) processes, intermediate files, online analytical processing (OLAP) layers, data marts, file transfers and operational data stores reporting layers. The OLAP enables the end-user tools to translate the data into BI reports via a series of interdependent flows and processes.

A so-called extract, transform, and load tool (e.g., IBM InfoSphere DataStage®) may be used to create one or more ETL jobs to extract target data from operational systems and place the extracted data in a data warehouse, and further manage data movement from the warehouse to a data mart. Developing the warehouse, populating it, moving the data to a data mart and then creating the necessary BI reports, using a BI tool, are large and complex projects.

Typically, many dozens of human operators or software developers are needed to develop, test and maintain the related ETL jobs and BI codes that are needed to produce the final reports. In addition, business analysts, data stewards, data modelers, enterprise architects and project managers dedicated to the reporting project may be needed. All these, combined with the ETL and BI developers result in very large teams of human operators.

Since ETL jobs have to run in a timely manner to ensure the BI reports are generated based on up-to-date information, a common scheduling approach is to run every single ETL job in the system very frequently (e.g., every night). Running many thousands of jobs on such frequently scheduled intervals requires a significant amount of resources and is time consuming

SUMMARY

In accordance with one embodiment, a method for optimizing job scheduling in a data processing system includes determining a time factor associated with a report, determining one or more jobs that contribute to the report, and narrowing execution frequency of the one or more jobs based on the time factor of the report. The time factor provides information about timing details for data included in the report, and the jobs are executed in a computing environment according to a time schedule.

In accordance with one or more embodiments, a system including a computer processor is provided. The computer processor includes one or more logic units. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE SEVERAL VIEWS OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
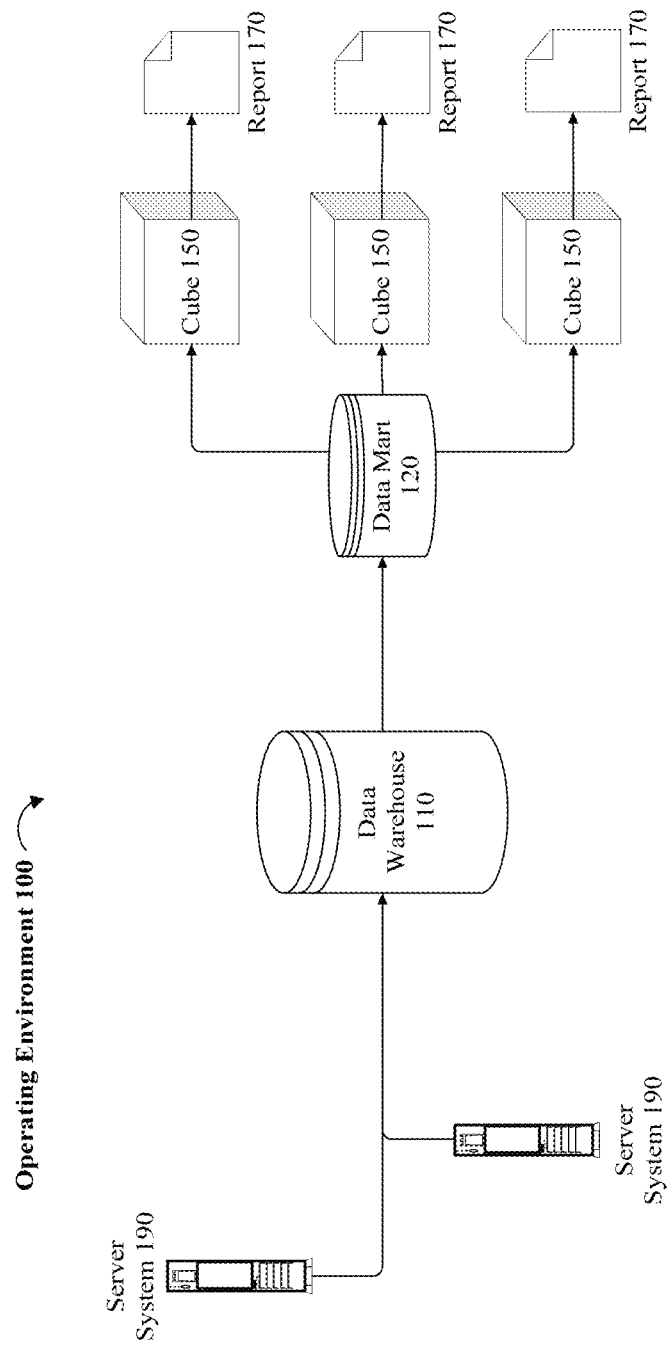
FIG. 1 illustrates an exemplary computing environment in accordance with one or more embodiments, wherein a data warehouse and a data mart are implemented to aggregate data for the production of BI reports.

Referring to FIG. 1, in an exemplary operating environment 100, one or more server systems 190 may be utilized to process day-to-day transactions in a business enterprise or in other computing environments. An ETL tool may be used to schedule the execution of computer implemented jobs to move or aggregate selected data from server systems 190 to domain-specific data warehouse 110 or data mart 120. This data movement and aggregation facilitates reporting, analysis and decision making in the operational environment 100.

Cubes 150 may be utilized for the purpose of further filtering or aggregating data from a data warehouse 110 or a data mart 120 to support the efficient generation of reports

170. For example, if the timing data stored in a data warehouse 110 includes information about sales of an item on a daily or weekly basis, a cube 150 may be implemented to filter out information included in the data warehouse 110 on a quarterly basis to facilitate the generation of a report 170 that includes sales information for the item on a quarterly basis.

In accordance with one embodiment, data in cubes 150 may be processed by way of one or more BI tools (e.g., IBM Cognos Enterprise®) to generate one or more reports 170. As noted, the reports are dependent on ETL jobs that are executed to aggregate data. To manage the scheduling of the jobs in an efficient manner, a two-stage approach may be implemented. In a first stage, the time factor (or time dimension) associated with reports 170 is determined In a second stage, a dependency analysis is performed to find the jobs that contribute to one or more target reports.

Figure 2:
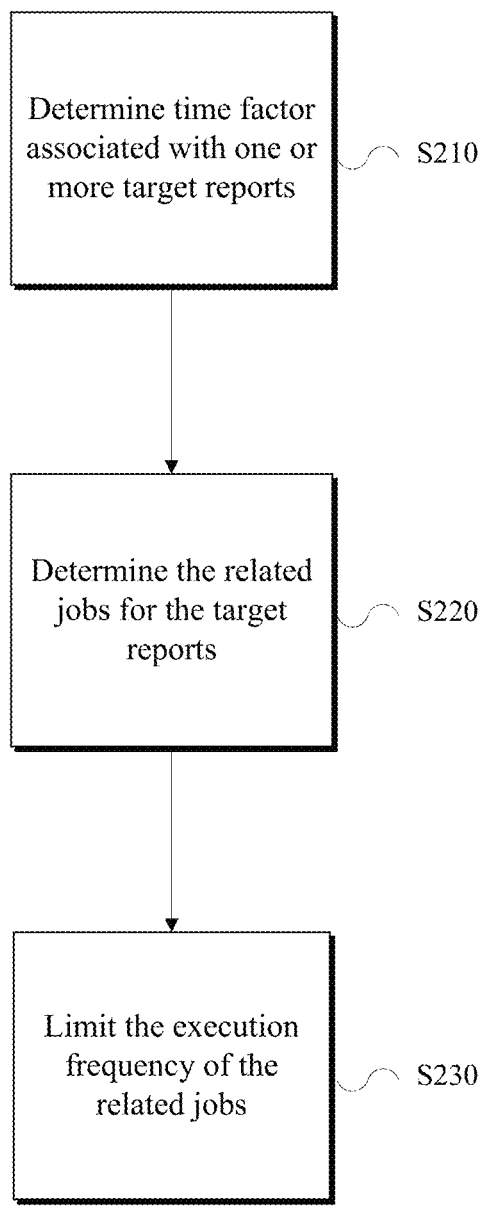
FIG. 2 is a flow diagram of an exemplary method for optimizing the generation of reports in accordance with one embodiment.

Referring to FIG. 2, during the first stage, one or more target reports may be analyzed and the time factor associated with the one or more target reports may be determined (S210). For example, it may be determined whether a report contains daily, monthly or quarterly information about the sale of an item. Depending on implementation, the time factor for a report may be determined by examining the formal definitions for the report, the contained fields and queries for the report, or by examining the frequency and timing of invocations of the report by users or by system calls.

In one example, a cube model may provide sales and expense facts according to time, geography and product dimensions. By way of example, the granularity of the time dimension at the lowest level may be reporting on a monthly basis. This would mean that for reports built based on the particular cube model, a time granularity of less than a month is not needed. Thus, the reports based on this model would not require jobs, that directly or indirectly deliver data to the report, to run more than once a month.

In the above example, if the report is only accessing the quarterly level of the time dimension of the cube, the requirement would be to run the jobs contributing to that report only quarterly and not monthly. The report may be examined to see which level of the time hierarchy of the cube the report is accessing. The result will indicate the scheduling requirements for the jobs that support the report.

In one embodiment, a data profiling tool may be utilized to analyze information included in a data warehouse schema, either at the data warehouse level, at the data mart level, or at the cube level. The schema may be in form of a star-configuration schema, for example, and include detailed information associated with a report in the time dimension. For example, the schema may include a data structure format that provides information about the daily sales for a product.

Accordingly, a data profiling tool (e.g., IBM InfoSphere Information Analyzer) for analyzing data types may be used to query or examine the relevant data structures in a schema or cube to find timing data (e.g., timing tables) for a report. When the timing data is found, then a data profiling tool for analyzing date and time may be used to determine the time interval details or granularity of timing data in a schema or cube (e.g., per day, per week, per month). An analysis of the timing data provides an understanding of how often jobs associated with that report need to be executed in order for the report to be accurate and up-to-date.

Depending on implementation, once the time factor for one or more reports 170 is determined, then the jobs associated with said reports 170 according to the identified time factor for may be determined (S220). Further, based on the identified time factor for the reports, the time schedule for the related jobs that contribute to the generation of the reports 170 is determined In one example, the pertinent time schedule for a job may be determined by analyzing the metadata associated with the job.

In one embodiment, a metadata management tool (e.g., IBM InfoSphere Metadata Workbench) may be used to collect and analyze the timeline related metadata and generate one or more data lineage graphs. Data lineage graphs provide information that identifies the relationship between a report and jobs (or sources of content) that are utilized to generate the report. For example, a data lineage graph may provide information to indicate the locations from which data is extracted or loaded into a data warehouse 110 by one or more jobs. The data lineage graph may also indicate how the output from one or more jobs is fed into a data model (e.g., a cube 150) in a data mart 120.

Referring back to FIG. 2, in accordance with one or more embodiments, once the jobs associated with the target reports are identified, the execution frequency of the jobs may be limited to the relevant timing factor associated with the reports (S230). For example, if a report is for quarterly sales of a product, then the jobs that are associated with that report may be run on a quarterly basis instead of daily. The scheduling for a job, as identified based on information in the data lineage result, may thus be modified to match the time factor of the corresponding report 170. This process may be repeated for multiple reports 170 to optimize the scheduling of other jobs in the operating environment 100.

In one embodiment, the time factor for a first report may justify narrowing the time schedule for execution of a first job that contributes to the first report to a quarterly execution for example. However, the first job may also contribute to a second report that may require the job to run more frequently (e.g., daily). In such a case, a hierarchical approach may be followed to determine whether the first report is deemed to have a higher priority or importance over the second job to determine whether to narrow the scope of execution of the first job.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3:
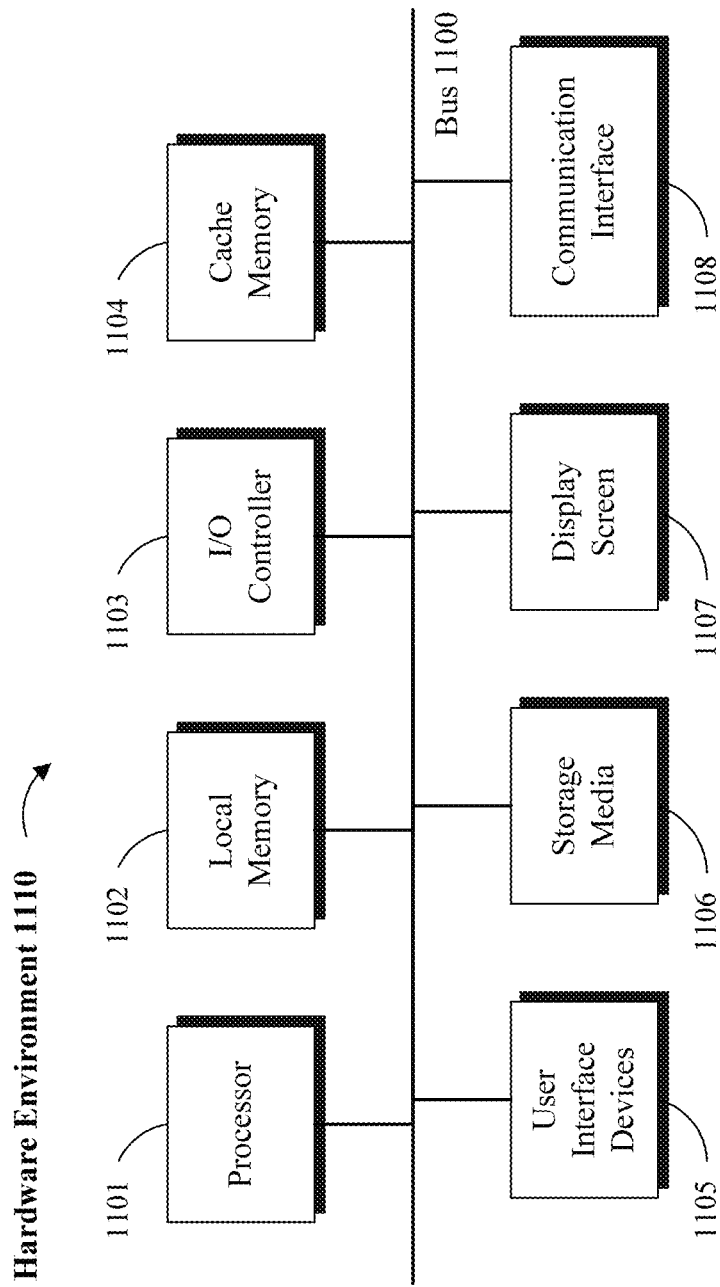
FIGS. 3 and 4 are block diagrams of hardware and software environments in which the disclosed systems and methods may operate, in accordance with one or more embodiments.
Figure 4:
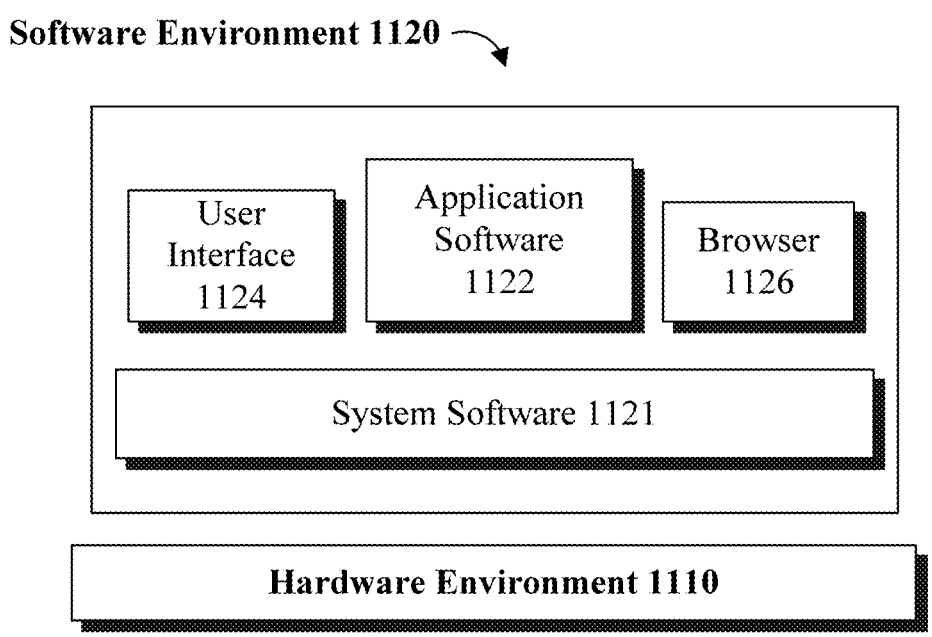

Referring to FIGS. 3 and 4, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

It should be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for optimizing job scheduling in a data processing system executed on a processor, the method comprising:
   determining a time factor associated with a report, wherein the time factor provides information about timing details for data included in the report;
   determining jobs that contribute to the report, the jobs executed in a computing environment according to a time schedule, wherein the determining the jobs that contribute to the report includes collecting timeline-related metadata from the jobs and generating one or more data lineage graphs, each of data lineage graphs includes information identifying relationships between the report and the jobs that are utilized to generate the report; and
   narrowing execution frequency of at least one of the jobs based on the time factor of the report.

2. The method of claim 1 wherein the jobs are executed to move or aggregate data from a first database to a second database.

3. The method of claim 1 wherein the time factor associated with the report is determined by analyzing information stored in a data model used to generate the report.

4. The method of claim 1 wherein the time factor associated with the report is determined by examining a formal definition associated with the report.

5. The method of claim 1 wherein the time factor associated with the report is determined by contained fields and queries for the report.

6. The method of claim 1 wherein the time factor associated with the report is determined by examining frequency and timing of invocations of the report by users or by system calls.

7. The method of claim 1 wherein the one or more jobs are scheduled for execution with a frequency that supports generation of the report with a first level of accuracy.

8. The method of claim 1, wherein the report is a business intelligence (BI) report.

9. The method of claim 1, wherein the jobs are extract, transform, and load (ETL) jobs.

10. The method of claim 1, wherein a data profiling tool is used to determine the time factor of the report and a metadata management tool is used to identify the jobs that contribute to the report.

11. A computer program product comprising a non-transitory computer readable storage medium having a computer readable program, wherein the computer readable program when executed on a computer causes the computer to:
    determine a time factor associated with a report, wherein the time factor provides information about timing details for data included in the report;
    determine jobs that contribute to the report, the jobs executed in a computing environment according to a time schedule, wherein determining the jobs that contribute to the report includes collecting timeline-related metadata from the jobs and generating one or more data lineage graphs, each of data lineage graphs includes information identifying relationships between the report and the jobs that are utilized to generate the report; and
    narrow execution frequency of the jobs based on the time factor of the report.

12. The computer program product of claim 11 wherein the jobs are executed to move or aggregate data from a first database to a second database.

13. The computer program product of claim 11 wherein the time factor associated with the report is determined by analyzing information stored in a data model used to generate the report.

14. The computer program product of claim 11 wherein the time factor associated with the report is determined by examining a formal definition associated with the report.

15. The computer program product of claim 11 wherein the time factor associated with the report is determined by contained fields and queries for the report.

* * * * *